United States Patent [19]

Yoli et al.

[11] 4,055,508
[45] Oct. 25, 1977

[54] CASK HANDLING METHOD AND APPARATUS

[75] Inventors: Alfred H. Yoli, New City, N.Y.; Igbal Husain, Danbury, Conn.

[73] Assignee: Automation Industries, Inc., Los Angeles, Calif.

[21] Appl. No.: 712,176

[22] Filed: Aug. 6, 1976

[51] Int. Cl.² ............................................. G21C 9/32
[52] U.S. Cl. ............................. 252/301.1 W; 176/30; 214/16 B; 214/17 B; 214/18 N; 252/301.15
[58] Field of Search ................. 214/18 N, 17 B, 16 B; 176/30; 252/301.1 W, 301.15

[56] References Cited

U.S. PATENT DOCUMENTS

| 3,819,066 | 6/1974 | Jones | 214/16 B |
|---|---|---|---|
| 3,883,012 | 5/1975 | Jones | 176/30 |

*Primary Examiner*—Benjamin R. Padgett
*Assistant Examiner*—Deborah L. Kyle
*Attorney, Agent, or Firm*—Thomas L. Flattery

[57] ABSTRACT

The method of transferring radioactive material into and out of the cask comprises positioning a tank with an open end in a well. Then a cask having a passage for moving radioactive material into and out of the cask is placed in the tank through the opening in the tank. The tank opening is then sealed to the cask relative to the well without sealing the passage relative to the well to prevent water filled into the well from leaking into the tank. Then the well is filled with water above the seal, and radioactive material is then moved through the water in the well through the passage into the cask. The tank may be filled with demineralized water from a separate source to pressurize the space in the tank on the other side of the seal from the well to prevent water in the well from entering the tank. The water level in the well and in the tank is then lowered, the tank opening to the cask seal is removed, and a cover is attached to the cask passage to maintain the radioactive material and contaminated water in the cask.

The apparatus which accomplishes the above method comprises a tank in a well for receiving a cask therein. A seal between the tank and the cask prevents water in the well from flowing into the tank about the cask and permits water in the well to flow through the cask opening into the cask. A first water supply means raises and lowers the water level in the well, and a second water supply means supplies clean demineralized water to the tank under pressure to prevent water in the well from leaking into the tank. The seal is annularly shaped and is attached to the top of the tank. The central portion of the annular seal is aligned with the cask opening and it has means to seal the annular seal to the cask.

15 Claims, 2 Drawing Figures

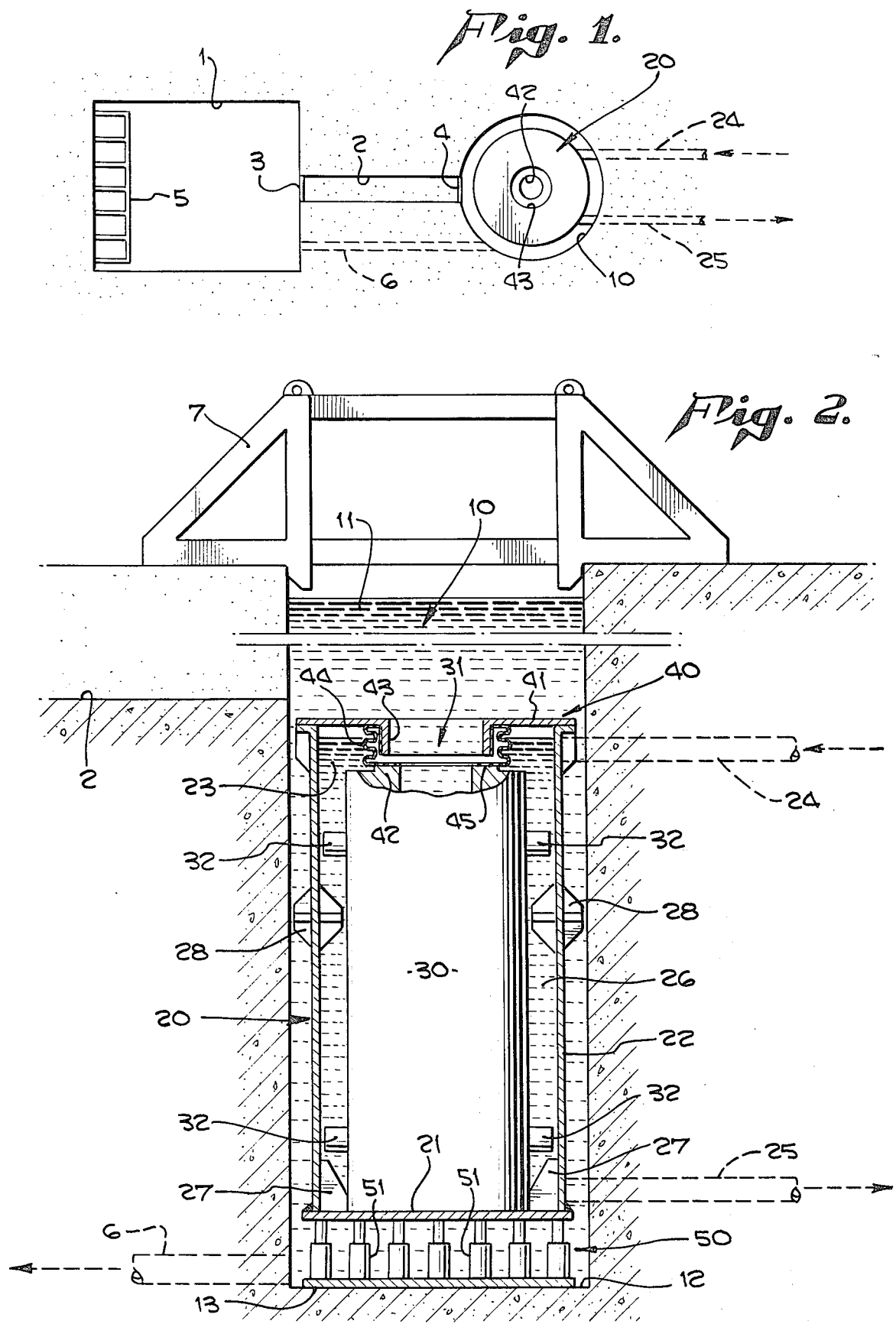

CASK HANDLING METHOD AND APPARATUS

BACKGROUND

Spent nuclear fuel in nuclear power plants is shipped and stored in spent fuel shipping casks. This invention concerns an improved method and apparatus for transferring spent fuel into the casks.

A number of different systems have been proposed to load casks with spent nuclear fuel. Before discussing the methods, some background into problems associated with spent nuclear fuel will be set forth. A nuclear reactor relies on nuclear fission to produce heat. Fuel rods containing fissionable material, such as U-235, are located within a reactor core where fission takes place. Periodically, the fissionable material must be changed as it is consumed and because other elements which are present in the fuel rods with the fissionable material change their properties on absorbing the various subatomics particles so that the materials interfere with the efficiency of the fission.

Even though the fuel elements are no longer useful for sustaining the fission reaction, they remain highly exothermic and radioactive so that storage and disposal of them is one of the more difficult problems facing the nuclear industry. Typically, the spent fuel is maintained under water because water will absorb the heat and acts as a shield for the radiation.

Under current regulations, all spent fuel must be stored so that it is recoverable. The current method of storage is in large spent fuel shipping casks. After the spent fuel loses some of its radioactivity and excess heat, the spent fuel is traferred into the shipping casks for shipments to long-term storage facilities or reprocessing plants. This invention primarily concerns transferring the spent fuel rods from the spent fuel water pool where they are stored immediately after removal from the reactor until they lose a sufficient degree of heat and radioactivity into the shipping cask.

One proposed method of transferring spent fuel from the spent fuel storage pool into a cask utilizes a crane to remove a fuel rod from the water and transfer it to a cask in a separate location. However, removing the fuel rod from the water creates radiation risks, and when the rod is removed from the water, it can rapidly begin to heat which causes its own problems. If a dry transfer of the fuel rod is used, sufficient shielding will have to be provided, and the apparatus necessary thereof is expensive.

Therefore, it is advantageous to transfer the fuel rods under water. The shipping casks in one proposed solution are lowered into the spent fuel pool and the transfer of the fuel takes place therein. However, immersing the cask in the spent fuel pool exposes the cask and the crane hook and cables to water containing substantial quantities of radioactive material so that the cask, hook and cables must be decontaminated. Cask decontamination involves substantial labor and generates large quantities of low level radioactive waste which must be treated before it can be released into the environment in accordance with stringent AEC requirements. It is also necessary to wash the crane hook and cables to prevent the spread of contamination. The use of water on the crane hook and cables can cause corrosion requiring more frequent replacements thereof.

Another problem associated with that method is protection to the integrity of the spent fuel pool in case the cask is dropped. Numerous precautions are taken to prevent a drop, but if a cask were dropped, it is possible to lose spent fuel pool water which acts as both a cooling and shielding for the spent fuel. In order to guard against that eventuality, it has been proposed to provide a separate cask loading well adjacent the spent fuel pool. The well is connected to the spent fuel pool by a canal through which the underwater transfer of fuel is made from the spent fuel pool to the cask loading well. Watertight doors isolate the well from the pool during the lifting and lowering of the cask. Consequently, if the cask is dropped and the bottom of the well is breached, no water is lost from the spent fuel pool. The cask can also be transferred into and out of the well without wetting the crane hooks and cables.

However, there are some disadvantages. First, the cask contacts the contaminated fuel pool water during fuel transfer. Therefore, it must be decontaminated prior to shipment. Secondly, the well is sufficiently deep to accommodate the cask plus a sufficient distance of water to maintain shielding. If the well is empty when the cask is being raised out of or lowered into the well, the cask will be more than 30 feet above the bottom of an empty cask loading well. Although dropping the cask will not breach the fuel pool, a cask may be damaged sufficiently to release the spent fuel or its radioactive fission products. Federal regulations (10 C.F.R. 71) only require cask integrity for cask drops up to 30 feet. Another disadvantage is that the cask is not guided when it is brought over the cask loading well. A drop during positioning above and the entry into the well may damage the adjacent fuel pool or interconnecting canal and gate system thereby complicating recovery from the accident.

A dry cask loading system has been proposed whereby the cask is placed inside a tank which is brought below the bottom of the well or fuel pool. The cask tank is coupled to the well or fuel pool with a redundant seal system. A seal between the cask and the cask tank keeps the outside surface of the cask dry and hence uncontaminated during all operations. A loading port with a hatch cover is provided in the bottom of the well or fuel pool. The port remains closed until the well has been filled with spent fuel pool water (if the system utilizes a well).

The system has the following advantages. The cask need not be carried over the spent fuel pool or the cask loading well; the cask is never lifted more than 30 feet; and contaminated fuel pool water does not contact the outside surface of the cask.

The dry cask handling system has certain disadvantages. First, the system is complex. A cask transporter with drive system is needed as is a cask tank, redundant seals between the loading port and the cask tank, seals between the cask and the cask tank, seal actuators and latches, a leak detention system, a shield sleeve with actuators, and a loading port hatch system. Second, the system must be designed to withstand seismic events with a cask in the transporter and at any point along the transfer path. Additional seismic ties may be required at the loading position because the loading port to cask tank seals could be latched to the cask tank which is mounted on the transporter. Third, because the outside of the cask remains dry because of the cask to cask tank seal, the static load of water in the well creates a load on the seals. The head of water being about 35 feet (10.5 meters) provides a loading of about 2400 lbs/ft$^2$ (1.17 kg/cm$^2$). Another problem associated with the dry cask handling system is the complexity and because the building structure must be increased to accommodate the system.

Therefore, it is an object of the present invention to provide a cask handling system which overcomes the difficulties of the prior art. A more specific object of the present invention is to disclose and provide a cask handling method and system which prevents the outside of the cask from contacting contaminated fuel pool water. A further object is to provide and disclose a cask handling method and system which alleviates the necessity for having the hook and cable of the cask transporting system coming into contact with any water especially contaminated fuel pool water. Another object of the present invention is to disclose and provide a method and system where the cask does not have to be lifted more than 30 feet above an empty cask loading well and to provide and disclose means for guiding the cask while it is being positioned in the well.

Further objects of the invention include disclosing and providing a system and method which alleviates many of the problems associated with dry cask handling and yet prevents contaminated fuel pool water from contacting the cask. There are objects of the present invention which include disclosing and providing a system and method which does not create large static loads on seal assemblies; to disclose and provide a method and apparatus minimizing the risk of seismic events during fuel transfer; an apparatus and method which is not as complex and expensive as dry loading; and a system which eliminates the additional building structure required in dry cask handling. In general, however, one of the primary objects of the present invention is to disclose and provide a method and apparatus for transferring nuclear wastes into and out of storage casks efficiently and at a low cost while decreasing the dangers associated with transporting the wastes and decreasing radioactive contamination to objects that will require decontamination.

SUMMARY

With the above objects in mind, the apparatus for preventing radioactive contaminated water in a well from contacting the outside of a cask positioned in the well to receive radioactive material being transported through the well and into the cask through an opening in the cask includes a tank in the well for receiving the cask therein. A seal between the cask and the tank prevents water in the well from flowing into the tank about the cask and permits water in the well to flow into the cask through the cask opening so that radioactive wastes can be moved through the contaminated water in the well into the cask without contaminating the outside of the cask. The apparatus includes a first water supply means for raising and lowering the water level in the well so that the radioactive material can be moved through the water into the cask when the level is raised. A second supply means supplies water from a source separate from the water in the well to the tank pressurizing the tank to prevent water in the well from leaking through the seal.

The tank includes a receiving plate for supporting the bottom of the cask and wall means on the upper surface of the receiving plate form the sides of the tank for sealing the wall to the receiving plate. Guide means on the tank orient the cask to an upright orientation when the cask is received in the tank. The seal comprises an annular plate connected generally at its outside to the upper part of the wall. A connecting portion along the central portion of the annular plate connects to the cask whereby the opening in the annular plate is generally aligned with the opening in the cask. The connecting portion includes a dependent seal depending from the central portion of the annular opening to the cask, and means attached to the depending seal connect the seal to the cask about the cask opening.

The method of the present invention includes the steps of positioning a tank having an open end inside a well. A cask having a passage for moving radioactive material into and out of the cask is placed into the tank through the opening in the tank. The tank opening is sealed to the cask relative to the well without sealing the passage relative to the well to prevent water filled into the well from leaking into the tank. The well is filled with water above the seal of the tank opening to the cask, and the radioactive material is moved through the water in the well through the passage into the cask. The tank is filled with water from a source separate from the water for the well to pressurize the space in the tank on the other side of the seal in the well to prevent water from the well from entering the tank. Then the water level in the well and in the tank may be lowered and the tank opening to the cask is unsealed. Then the passage of the cask is closed with a cover to maintain the radioactive material and the contaminated water in the cask.

DRAWINGS

FIG. 1 is a schematic of the apparatus of the present invention and is shown generally as a top view.

FIG. 2 is a side elevation in section showing the apparatus of the present invention and showing a cask in a tank and sealed therein, and the tank is mounted in the well.

DESCRIPTION

The method and apparatus of the present invention are practiced in the environment shown in schematic in FIG. 1. Spent fuel rods are transferred from the reactor (not shown) through transfer apparatus (not shown) under water into the spent fuel pool 1, and the fuel is stored in storage racks 5. Spent fuel pool 1 is filled with water which acts both as shielding for the highly radioactive spent fuel and as a coolant because the spent fuel is very exothermic. For reasons set forth in the "Background," the spent fuel is allowed to cool and lose some of its radioactivity over a period of time, and thereafter it is transferred into a cask for transport off site. Also for reasons set forth in the "Background," a transfer takes place in a separate fuel transfer well 10. Interconnecting the spent fuel pool 1 and the well 10 is a canal 2 which is sufficiently deep so that the spent fuel rods can be moved therethrough. A pair of watertight doors 3, 4 isolate the canal 2 from the spent fuel pool 1 and from the well 10. The doors allow the raising and lowering of the water level in the spent fuel pool independently from the water level in the well. Moreover, if there is an accident in either the well 10 or the spent fuel pool 1, the doors 3, 4 will isolate the other. Normally, the water level in the spent fuel pool 1 is maintained relatively constant, and for reasons set forth below, the water level in the well may be modified. The normal method of modifying the water level would include opening doors 3, 4 so that the water level in the well 10 and the spent fuel pool 1 would equalize. Typically, this would be used to raise the water level in the well 10. When the water level was desired to be lowered, water could be pumped through pipe 6 from the well 10 back into the spent fuel pool 1 by means of a pumping apparatus (not shown).

The apparatus of the present invention for preventing radioactive contaminated water in a well from contacting the outside of a cask position in the well to receive radioactive material being transported through the well and into the cask through an opening in the cask comprises tank means in the well for receiving the cask therein. In the preferred exemplary embodiment, the tank means 20 is shown in FIG. 2 to be in well 10. In the preferred exemplary embodiment, the tank 20 is generally cylindrical to conform to the cylindrical cask. Therefore, the well 10 should also be round. However, it should be understood that deviations are possible, and a rectangular well and/or a rectangular tank could also be used.

The tank means 20 comprises a receiving plate 21 for supporting the bottom of the cask, and wall means 22 is sealed to the upper surface of the receiving plate for forming the sides of the tank for preventing water from leaking into or out of the tank from the well. The sealing between the wall means 22 and the receiving plate 21 preferably takes the form of a weld, but other methods are contemplated. As stated above, the wall means 22 are generally cylindrical to accommodate the cylindrical cask.

In FIG. 2, the cask 30 is shown in tank means 20. In prior art arrangements, the cask 30 was positioned into a well without a tank. As explained above, the water level in the well is raised and lowered by means of water from the spent fuel pool. Therefore, were it not for the tank 20, the cask 30 would come into contact with contaminated water. In order to prevent this contaminated water from contacting the cask, the wall means 22 are sealed to the receiving plate 21. To further seal the tank, a seal means must be provided to seal the opening through which the cask is lowered into the tank.

Therefore, seal means between the tank and the cask prevent water in the well from flowing into the tank about the cask and permits water in the well to flow into the cask through the opening in the cask whereby radioactive wastes can be moved through the contaminated water in the well into the cask without contaminating the outside of the cask. In the preferred exemplary embodiment, the seal means 40 comprises an annular plate 41 which is sealed to the upper part of the wall means 22 of tank 20. Connecting means are provided along the central portion of the annular plate for connecting to the cask whereby the opening in the annular plate is generally aligned with the opening of a cask.

In the exemplary embodiment, the opening 31 in the cask 30 is generally centrally located on top of the cask 30. Therefore, in the exemplary embodiment, the connecting means 42 of the seal means is along the central portion of the annular plate and connects to the cask so that the opening 43 in the annular plate is generally aligned with the opening 31 into the cask.

The connecting means further comprise depending seal means depending from the central portion of the annular opening to the cask. Means attached to the depending seal means are also provided for connecting the depending seal means to the cask about the cask opening. In the exemplary embodiment, depending seal means 44 depends from the central portion of the annular plate 41 to the cask 30 and means are provided on the depending seal means for connecting it to the cask 30 about the cask opening. The means 45 for attaching the depending seal means to the cask may be any of a variety of well-known connectors which would prevent seepage between the seal and the cask. Moreover, the cask 30 would normally be provided with a cover which would latch to the cask to prevent the radioactive wastes from leaking out of the cask. The seal may have identical structure to the cover so that it may use the same structure on the cask for connecting thereto.

First water supply means are provided for raising and lowering the water level in the well so that the radioactive material can be moved through the water into the cask when the level is raised. Second supply means supplies water from a source separate from the water in the well to the tank pressurizing the tank to prevent water in the well from leaking through the seal.

Turning again to FIG. 2, in the preferred exemplary embodiment, normally, the tank would be first filled although the well could be filled first or both could be filled simultaneously. Clean demineralized water is pumped from a source through fill line 24 to fill the tank 20. In actual operation, the seal means 40 would be sealed to the tank 20 and the cask 30 prior to filling the tank 20. When the tank 20 is to be emptied, water is allowed to flow through drain line 25 back to the storage tank for the clean demineralized water.

In the preferred exemplary embodiment, the first water supply means for raising and lowering the water level in the well comprises the spent fuel pool 1, the canal 2, the watertight doors 3, 4 and the pipe 6, which operate in a manner set forth above. As shown in FIG. 2, the tank is filled with the clean demineralized water shown generally at 26 in preparation for loading and unloading spent fuel into cask 30. After the tank opening is sealed to the cask relative to the well, the well is filled with spent fuel pool water shown generally at 11 to a sufficient height. Normally, the clean demineralized water 26 will be pressurized to compensate from the pressure of the head of well water 11 above the seal means 40. Therefore, if the seal means 40 does develop a leak, clean demineralized water will flow under pressure through the leak into the well rather than having contaminated water flow into the tank to contaminate the inside of the tank and the outside of the cask.

As shown in FIG. 2 in the exemplary embodiment, water in the well can flow through the opening into the cask to fill the cask with spent fuel pool water. Thereafter, the spent nuclear fuel is transferred through the canal 2 from rack 5 in the spent fuel pool 1. The spent fuel is brought past doors 3, 4 into the upper portion of well 10 through the contaminated water 11 and then through the opening 43 in the seal means and the opening 31 in the cask into the central portion of the cask where it is stored.

Energy absorbing means is attached to the tank for absorbing energy of the cask moving into the tank. Many different types of energy absorbing means may be provided. However, it is preferable to use the energy absorbing apparatus disclosed in our copending application filed Aug. 9, 1976, Ser. No. 712,512. The energy absorbing means comprises energy absorbing members on the floor of the well. The energy absorbing members including means for attaching the energy absorbing members to the lower surface of the receiving plate whereby the imposition of kinetic energy from a moving cask on the receiving plate transmits energy to the energy absorbing members to absorb the excess kinetic energy. In the preferred exemplary embodiment, the energy absorbing means 50 comprise a plurality of energy absorbing members 51 which are mounted on the floor 12 of well 10. In the preferred emobidment of FIG. 2, a supporting plate 13 is mounted on the floor 12 and the energy absorbing members are attached to the plate 13 for example by welding. The energy absorbing means are attached to the underside of the receiving plate 21 again, for example, by welding. Therefore, when a load is applied to the receiving plate 21 through the movement of cask 20, the energy absorbing means 50 will absorb and dissipate the kinetic energy to prevent damage to the cask and the well. The energy absorbing means preferably operates on a principle disclosed in copending application Ser. No. 712,512, which disclosure is incorporated herein by reference.

It is further contemplated that the energy absorbing members 51 could be embedded in the bottom wall of well 10.

Guide means are provided on the tank for orienting the cask to an upright orientation when the cask is received in the tank. In the exemplary embodiment, guide means 27 assure that the cask is in the orientation shown in FIG. 2 so that the seal means will make a sealing contact with the cask.

A secondary guide structure rests on the top of the well to assist in guiding the cask into the tank. The guide structure 7 is removable from above the well and the same crane which transports the cask can be used to transport the guide structure 7.

It should be noted that the cask is provided with short arms 32 to which the hooks from the crane grab the cask 30.

The tank 20 is further provided with seismic restraints 28 to prevent damage to the cask and tank during a seismic event.

The method of transferring radioactive material into and out of the cask comprises the following steps. First the tank 20 having an open end 23 is positioned in well 10. Then cask 30 having a passage 31 for moving radioactive material into and out of the cask is placed into the tank 20 through the opening 23 of the tank. The tank opening 23 is sealed to the cask 30 relative to the well to prevent water filled into the well from leaking into the tank. The well 10 is then filled with water above the seal 40, and radioactive material is moved through the water in the well through the passage 31 into the cask 30.

The tank is filled with water from a source separate from the well water to pressurize the space in the tank 20 on the other side of the seal 40 and the well 10 to prevent water from the well 10 from entering the tank 20. Then the water level in the well 10 and in the tank 20 is lowered, the tank opening to the cask unsealed and the passage 31 of the cask is closed with a cover to maintain the radioactive material and contaminated water in the cask.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

We claim:

1. Apparatus for preventing radioactive contaminated water in a well from contacting the outside of a cask to be positioned in the well to receive radioactive material being transported through the well and into the cask through an opening in the cask, comprising:

tank means positioned in the well and having an upper opening for receiving the cask lowered therethrough to be placed within said tank means;

seal means between the tank means and cask for preventing water in the well from flowing into the tank means about the cask and permitting water in the well to flow into the cask through said cask opening whereby radioactive wastes can be moved through the contaminated water in the well into the cask without contaminating the outside of the cask.

2. The apparatus of claim 1 further comprising:

first water supply means for raising the water level in the well above the top of the tank means so that the radioactive material can be lowered through the water into the cask and for lowering the level of water in the well below the top of the tank means so that the cask can be loaded into the tank means without contacting the water in the well.

3. The apparatus of claim 2 comprising:

second supply means for supplying water from a source separate from the water in the well to the tank means for pressurizing the tank means to prevent water in the well from leaking through the seal.

4. The apparatus of claim 1 wherein said tank means comprises a receiving plate for supporting the bottom of the cask and wall means sealed to the upper surface of said receiving plate for forming the sides of the tank means for preventing water from leaking into or out of the tank from the well.

5. The apparatus of claim 4 further comprising energy absorbing means attached to said tank mean for absorbing energy of said cask moving into the tank means.

6. The apparatus of claim 5 wherein said energy absorbing means comprises energy absorbing members on the floor of said well means, said energy absorbing members including means for attaching said energy absorbing members to the lower surface of the receiving plate whereby the imposition of kinetic energy from a moving cask on the receiving plate transmits energy to the energy absorbing members to absorb the excess kinetic energy.

7. The apparatus of claim 1 wherein said tank means comprises guide means for orienting the cask to an upright orientation when the cask is received in the tank means.

8. The apparatus of claim 4 wherein said seal means comprises an annular plate connected generally at the outside thereof to the upper part of the wall means and connecting means along the central portion of said annular plate for connecting to said cask whereby the opening in said annular plate is generally alligned with the opening of the cask.

9. The apparatus of claim 8 wherein said connecting means comprises depending seal means depending from the central portion of said annular plate to the cask and means attached to said depending seal means for connecting said depending seal means to said cask about said cask opening.

10. A method of transferring radioactive material into and out of a cask comprising:

positioning a tank having an open end in a well;

placing a cask with a passage for moving radioactive material into and out of the cask into the tank through the opening in the tank;

sealing the tank opening to the cask relative to the well without sealing the passage relative to the well to prevent water filled into the well from leaking into the tank;

filling the well with water above the seal of the tank opening to the cask; and moving the radioactive material through the water in the well through the passage into the cask.

11. The method of claim 10 further comprising:

filling the tank with water from a source of water separate from the water for the well to pressurize the space in the tank on the other side of the seal than the well to prevent water from the well from entering the tank.

12. The method of claim 2 further comprising lowering the water level in the well and in the tank, then unsealing the tank opening to the cask and covering the passage of the cask with a cover to maintain the radioactive material and contaminated water in the cask.

13. The method of claim 10 comprising mounting a guide structure on the outside of the well means for guiding the cask into the tank.

14. In a method preparing a cask for the loading therein of contaminated material which must remain submerged, the improvement comprising:

positioning a tank having an open end in a well;

placing a cask with a passage for moving contaminating material into and out of the cask into the tank through the opening in the tank;

sealing the tank opening to the cask relative to the well without sealing the passage relative to the well to prevent water filled into the well from leaking into the tank; and filling the well with water above the seal of the tank opening to the cask whereby contaminated material can be moved through the water in the well through the passage into the cask.

15. The improved method of claim 14 further comprising:

filling the tank with water from a source of water separate from the water for the well prior to filling the well with water above the seal to pressurize the space in the tank on the other side of the seal than the well to prevent water from the well from entering the tank.

* * * * *